United States Patent [19]

Shields

[11] 4,271,587

[45] Jun. 9, 1981

[54] APPARATUS FOR CONTINUOUSLY INVERTING SHEATHS AND PLACING THE SHEATHS ONTO ARTICLES

[76] Inventor: Walter Shields, 181-41 Henley Rd., Jamaica, N.Y. 11432

[21] Appl. No.: 56,883

[22] Filed: Jul. 12, 1979

[51] Int. Cl.³ .............................................. B23Q 7/06
[52] U.S. Cl. ..................................... 29/809; 29/771; 29/777; 29/785; 53/307; 198/480
[58] Field of Search ................. 29/771, 777, 785, 790, 29/809; 53/303, 304, 307, 308, 309; 198/480

[56] References Cited

U.S. PATENT DOCUMENTS

| 3,267,567 | 8/1966 | Shields | 29/777 |
| 3,374,605 | 3/1968 | Satchwell et al. | 53/307 |
| 3,597,826 | 7/1969 | Shields | 29/777 |
| 3,623,210 | 11/1971 | Shields | 29/429 |
| 3,877,569 | 4/1975 | Shields | 198/377 |
| 4,070,756 | 1/1978 | Shields | 29/809 |
| 4,076,113 | 2/1978 | Shields | 198/480 X |

Primary Examiner—Nicholas P. Godici
Assistant Examiner—C. J. Arbes
Attorney, Agent, or Firm—Jordan and Hamburg

[57] ABSTRACT

An apparatus for continuously inverting the orientation of sheaths comprises a rotationally indexing wheel having a concavity at a side surface thereof and a plurality of holes provided around the wheel spaced from each other, the holes extending from the outer periphery of the wheel to the concavity thereof for receiving the sheaths at a first station and transmitting the same to a second station at which the orientation of the sheaths is different from the orientation of the sheaths at the first station. The apparatus further comprises means for consecutively feeding the sheaths to the holes at the first station including means for continuously supplying the sheaths in an upright position in alignment with the hole to which the sheath is fed and means for transporting the sheaths supported by the supply means to the holes of the wheel, and means for releasing the sheaths from the holes at the second station to thereby place the sheaths onto the articles consecutively indexed.

3 Claims, 2 Drawing Figures

APPARATUS FOR CONTINUOUSLY INVERTING SHEATHS AND PLACING THE SHEATHS ONTO ARTICLES

BACKGROUND OF THE INVENTION AND PRIOR ART DESCRIPTION

The invention relates to an apparatus for continuously inverting sheaths and placing the sheaths onto articles. More particularly, the invention is directed to an apparatus for continuously inverting sheaths including vertically and upwardly oriented open ends and placing the inverted sheaths onto vertically and upwardly oriented hypodermic needles of syringe sub-assemblies.

A syringe comprises a syringe vial, a hypodermic needle connected to one end thereof and a syringe piston, which were, in the past, sterilized after each usage. However, syringes which are frequently used in the hospital and the like are sterilized and are fully assembled in the factory for the purpose of labor-saving at the time of usage.

In U.S. Pat. No. 3,623,210, there is disclosed a method and apparatus for applying a sheath to a hypodermic needle secured in a vial, wherein after the interior of the vials and needles are cleaned, the sheaths are successively placed onto the needles. The sheaths are supported in a hopper in a direction that open ends of the sheaths are pointed downwardly and are successively transported to tubular members of jaw levers, below which the vials are positioned. When the jaw levers are lowered, the sheath is placed on the needle.

U.S. Pat. No. 4,070,756 discloses an apparatus for holding hypodermic needles straight and placing sheaths thereonto, in which the needles are held below and in the center of a vertical path, and the sheaths, open ends of which are pointed downwardly, are supplied to the needles through the path, whereby the sheaths are securely placed onto the needles.

The apparatus shown in U.S. Pat. No. 4,070,756 is good for placing the sheaths onto the needles of syringe sub-assemblies, but in practice it is necessary to successively provide the sheaths to the path with the open ends thereof pointed downwardly. The same problems are shown in U.S. Pat. No. 3,623,210.

Therefore, an object of the invention is to provide an apparatus for continuously inverting sheaths and surely placing the sheaths onto articles.

Other objects and advantages of the invention will be apparent from the following description of the invention.

SUMMARY OF THE INVENTION

In accordance with the present invention, there is provided an apparatus for continuously inverting sheaths and placing the sheaths onto articles. The apparatus comprises a rotationally indexing wheel which is concave at a side surface thereof and a plurality of holes provided around the wheel equally spaced from each other, the holes extending from an outer periphery of the wheel to the concavity thereof for receiving the sheaths at a first station and transmitting the same to a second station at which the orientation of the sheaths is different from the orientation of the sheaths at the first station. The apparatus further includes means for consecutively feeding the sheaths to the holes at the first station including means for continuously supplying the sheaths in an upright position in alignment with the hole to which the sheath is fed, means for transporting the sheaths supported by the supply means to the holes of the wheel, and means for releasing the sheaths from the holes at the second station to thereby place the sheaths onto the articles consecutively indexed.

The first and second stations are on a vertical line extending through the center of the wheel. The first station is located at an upper position of the wheel and the second station is located at a lower position of the wheel.

The means for releasing the sheaths from the holes is air ejection means including an end situated within the concavity and just at the second station. The air ejection means is intermittently actuated to eject air from the end thereof when the holes are positioned at the second station, so that the sheaths in the holes are consecutively released therefrom and are placed on the articles situated below the holes.

The apparatus in accordance with the invention is especially intended to invert sheaths including vertically upwardly oriented open ends and annular shoulders around the open ends and to place the sheaths onto vertically upwardly oriented hypodermic needles of syringe sub-assemblies.

Therefore, each hole includes a tapered depression at the outer periphery of the wheel to support the annular shoulders of the sheaths therein at the first station.

The means for supplying the sheaths comprises a pair of guide rails to support the annular shoulders of the sheaths and a pusher to intermittently push the sheaths. The means for transporting the sheaths comprises an air cylinder having a piston and a rod connected thereto which transmits the sheaths from the upright position to the holes successively. The rod is generally situated in a retracted position above the guide rail, and when the wheel is indexed and the hole is stopped at the first station, the piston of the cylinder is actuated so that the rod extends to transmit the sheath to the hole. Then, the rod is returned to its retracted position, and thereafter the pusher is actuated to supply the next sheath in the upright position.

Preferably, the apparatus further includes means for assuring the straightness of the needles at the second station to facilitate the placing of the sheaths onto the needles, which is substantially disclosed in U.S. Pat. No. 4,070,756. Similarly, the syringe sub-assemblies are supported on a turret rotationally indexed to align with the second station, and after the sheaths are placed on the needles, the sheaths are firmly engaged therewith by other means.

DETAILED DESCRIPTION OF A PREFERRED EMBODIMENT

Figure 1:
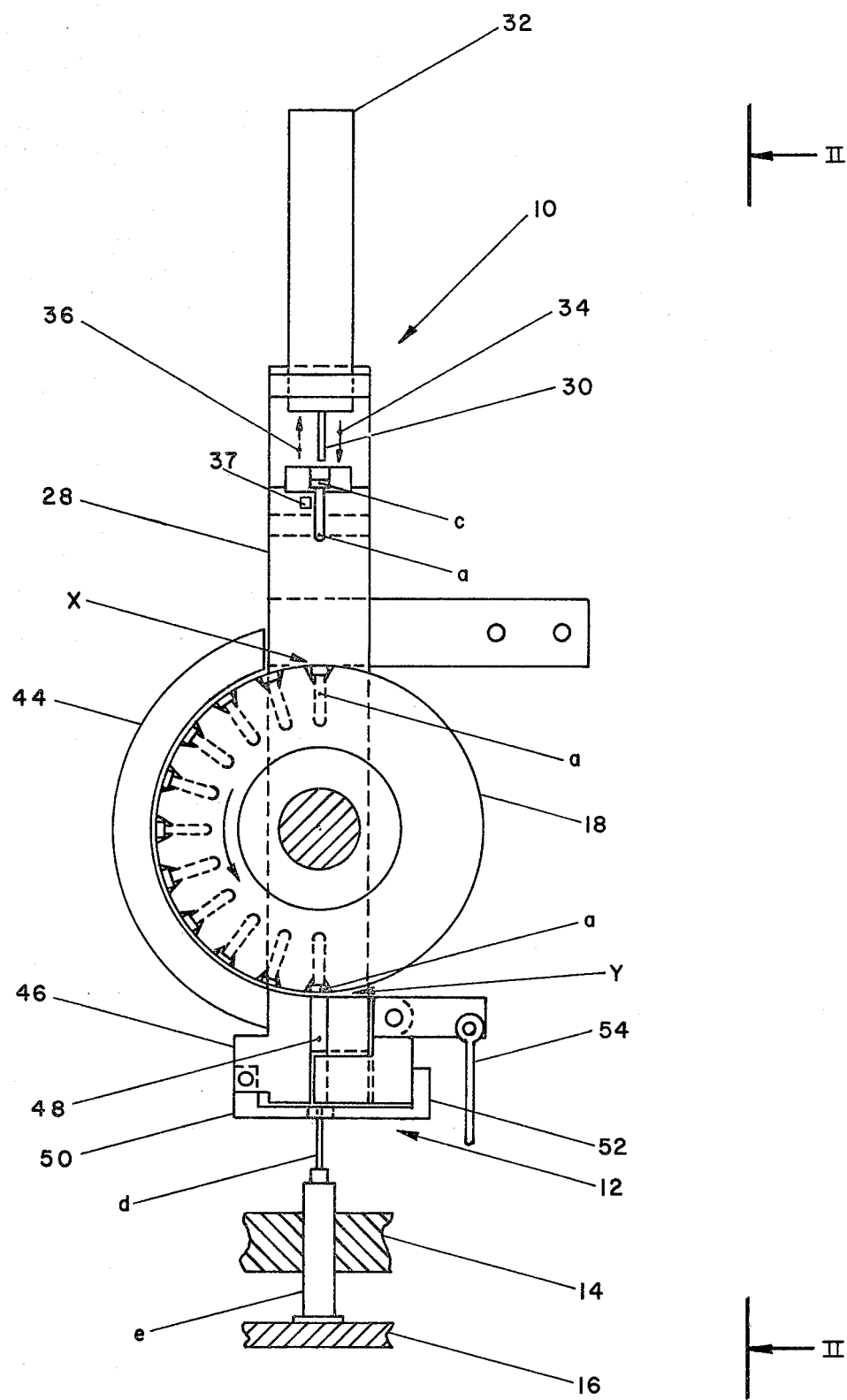
FIG. 1 is a front view of an apparatus according to the present invention, in which means for assuring the straightness of needles of syringe sub-assemblies and a turrent for supporting the syringe sub-assemblies are partly shown.
Figure 2:
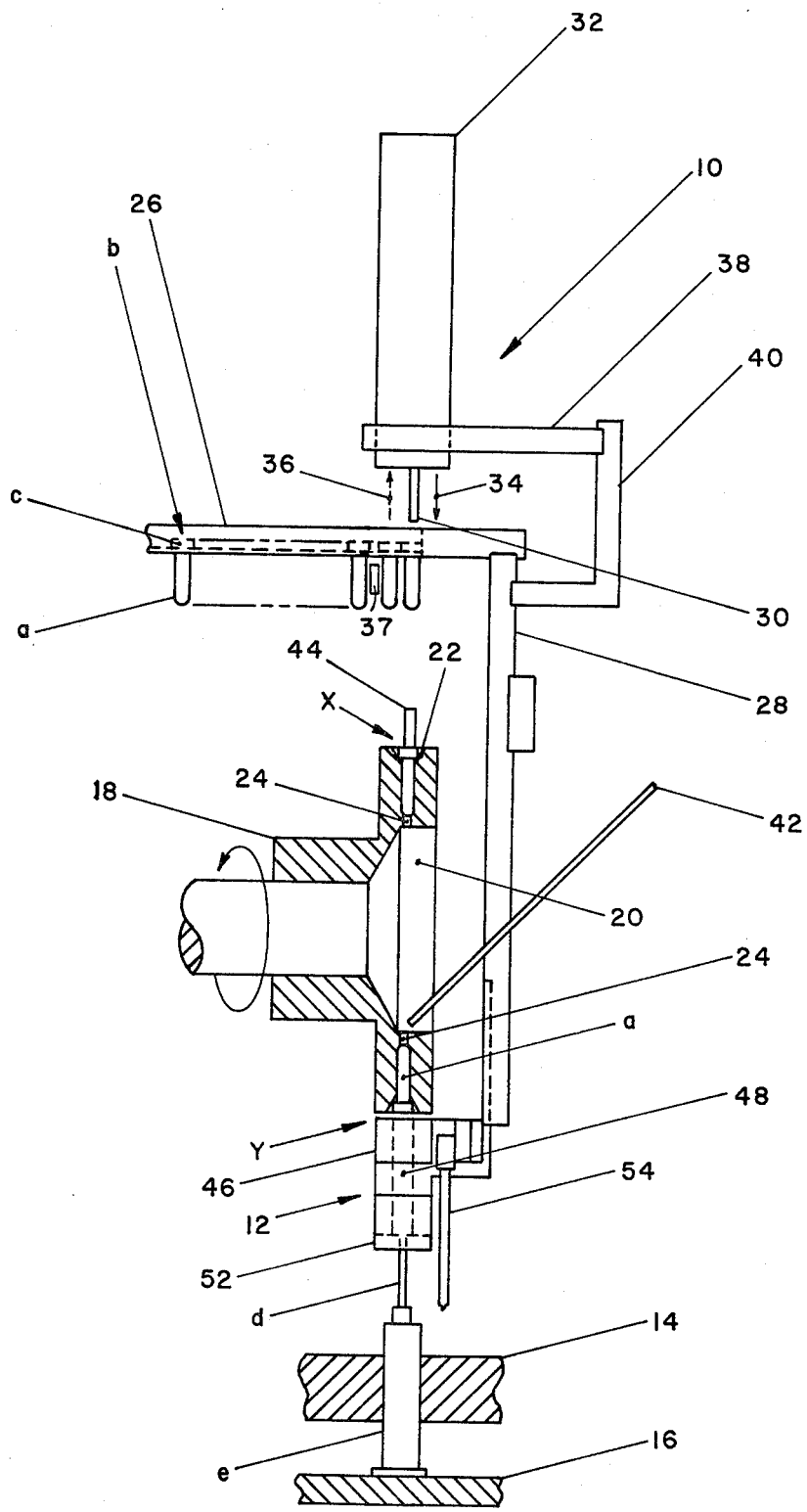
FIG. 2 is a side view taken along lines II—II of FIG. 1.

Referring to FIGS. 1 and 2, there is shown an apparatus 10 in accordance with the invention, which is especially intended to consecutively invert sheaths a including vertically upwardly oriented open ends b and annular shoulders c around the open ends b and to place the sheaths a onto vertically upwardly oriented hypodermic needles d of syringe sub-assemblies e. The apparatus 10 is used in combination with means 12 for assuring the straightness of the needles d and a turret 14 having a guide ring 16 for consecutively supporting and providing the sub-assemblies e to a location at which the sheaths a are placed.

The apparatus 10 comprises a wheel 18 having a concavity 20 at a side surface thereof and a plurality of tapered depressions 22 around the outer periphery of the wheel 18 equally spaced from each other, from the bottoms of which holes 24 extend radially inwardly up to the concavity 20. The depression 22 and hole 24 are such sizes that the depression 22 supports the annular shoulder c and the hole 24 receives the body of the sheath a. The wheel 18 is rotationally indexed by motor means (not shown), and sheaths a are supplied continuously to the holes 24 at a first station X and are placed onto the needles d at a second station Y. The stations X, Y are on a vertical line extending through the center of the wheel 18, the first station X being located at an upper position of the wheel 18 and the second station Y being located at a lower position of the wheel, so that when the sheaths a are transmitted from the first station X to the second station Y, the orientation of the sheaths a is inverted. the sheaths a are transmitted from the first station X to the second station Y, the orientation of the sheaths a is inverted.

Above the wheel 18, there is provided a pair of rails 26 connected to a frame 28, which support the shoulders c of the sheaths a. The sheaths a are situated between the rails 26 in side by side relationship, and an end sheath a which is located just above the first station X is carried to the hole 24 at the first station X by a rod 30 connected to a piston of an air cylinder 32.

The rod 30 is generally located at a retracted position shown in FIGS. 1 and 2, and when the piston is actuated, the rod 30 goes down as indicated by an arrow 34 to thereby carry the sheath a to the hole 24 at the first station X and soon returns as indicated by an arrow 36 to the retracted position. Then, a pusher (37) is actuated to forward the next sheath a supported by the rails 26 to the position just above the station X. At this time, the wheel rotates and the next empty hole 24 is positioned at the first station X. Namely, when the rod 30 is moved down, the rod 30 is at first inserted into the sheath a. Since the rod 30 is further moved downwardly, the shoulder c of the sheath a is deformed and is forcibly disengaged from the rails 26. Then, the sheath a is transferred to the hole 24 by the rod 30. The sheath a is formed of a soft material, so that the sheath a can be easily moved from the position between the rails 26 by deformation of the shoulder c and is transferred to the hole at which time the sheath a returns to the original configuration.

Incidently, the air cylinder 32 is connected to the frame 28 by arms 38, 40, and the frame 28 is also supported by a stand (not shown).

The apparatus 10 includes an air ejection tube 42, an end of which is situated within the concavity 20 and just above the second station Y. The tube 42 is actuated to intermittently eject air from the end thereof, so that when the hole 24 having a sheath a therein is indexed and stopped at the second station Y, the sheath a is released therefrom.

A cover 44 is provided to substantially cover a half portion around the wheel 18 to prevent the sheaths a from inadvertently releasing out of the holes 24 during rotational indexing of the wheel 18 from the first station X to the second station Y. The cover 44 is secured to the frame 28 through a base 46 connected thereto.

When the sheath a falls off at the second station Y, the sheath a passes through a bore 48 in the base 46 and gets on the needle d of the sub-assemblies e which is positioned in the center of the bore 48 by means 12 for assuring the straightness of the needle including a pair of clamping members 50, 52. The clamping members 50, 52 are pivotally secured to the base 46, and when a rod 54 is pulled downwardly, the clamping members 50, 52 swing to contact with each other, thereby supporting the needle d in the center of the bore 48. On the contrary, if the rod 54 is pushed upwardly, the clamping members 50, 52 swing away from each other. The detailed construction of the means 12 is substantially disclosed in U.S. Pat. No. 4,070,756.

The turret 14 supporting the syringe sub-assemblies e around the outer periphery thereof is rotationally indexed to intermittently provide the sub-assemblies e to the position in alignment with the second station Y. After the sub-assembly e is positioned, the means 12 is actuated to hold the needle d in the center of the bore 48, and then the sheath a is released from the hole 24, whereby the sheath a is placed onto the needle d of the sub-assemblies e.

The invention has been described with reference to a specific embodiment, but it is to be understood that the description is illustrative and the invention is limited only by the appended claims.

What is claimed is:

1. Apparatus for continuously inverting sheaths having vertically upwardly oriented open ends and annular shoulders around the open ends and for placing the sheaths onto the articles, comprising a rotationally indexing wheel having a concavity at a side surface thereof, a plurality of tapered depressions provided around the outer periphery of the wheel equally spaced from each other and a plurality of holes radially inwardly extending from the tapered depressions to said concavity for receiving therein the sheaths at a first station and transmitting the same to a second station at which the orientation of the sheaths is entirely inverted, the second station being positioned just above a location to which the articles are consecutively indexed, the shoulders of the sheaths being located in the tapered depressions when the sheaths are fully inserted into the holes, means for continuously supplyingeach of the sheaths in an upright position in alignment with the respective hole to which the respective sheath is fed, said means for supplying the sheaths consisting essentially of a pair of guide rails to support the annular shoulders of the sheaths and a pusher to intermittently push the sheaths in order to move the sheaths continuously to the desired upright position, means for transporting the sheaths supported by the guide rails to said holes of said wheel, said means for transporting the sheaths including an air cylinder having a piston therein operated by air pressure and a piston rod connected to the piston, said air cylinder being actuable such that when operated, the piston rod enters the sheath supported in position by the guide rails and forces the sheath downwardly through said guide rails and inserting the sheath into the hole, and air ejection means for releasing the sheaths from the holes at the second station, an end of the air ejection means being located within said concavity at the second station and the air ejection means being intermittently actuable to eject air from the end when the holes are positioned at the second station, whereby the sheaths at the second station are consecutively released from the holes and are placed over the articles consecutively indexed to be located just below the second station.

2. Apparatus as claimed in claim 1, further including a cover adjacent to the outer periphery of the wheel and extending from the first station to the second station to prevent the sheaths from being inadvertently released from the holes while being inverted.

3. Apparatus as claimed in claim 1 for continuously inverting sheaths and placing the sheaths onto vertically upwardly oriented hypodermic needles of syringe sub-assemblies, further comprising a pair of clamping members situated below the second station, said clamping members being actuable such that when the syringe sub-assembly is indexed and stopped below the second station, the clamping members move to clamp the needle of the syringe sub-assembly to hold the needle straight, whereby the sheath settles over the needle after the sheath is released from the wheel.

* * * * *